(12) United States Patent
Lille (10) Patent No.: US 7,880,995 B2
(45) Date of Patent: Feb. 1, 2011

(54) METHOD, SYSTEM, AND COMPUTER PROGRAM PRODUCT FOR THERMALLY ASSISTED RECORDING SYSTEMS

(75) Inventor: Jeffrey S. Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 386 days.

(21) Appl. No.: 12/024,018

(22) Filed: Jan. 31, 2008

(65) Prior Publication Data

US 2009/0195905 A1 Aug. 6, 2009

(51) Int. Cl.
*G11B 5/02* (2006.01)

(52) U.S. Cl. .................................................... 360/59

(58) Field of Classification Search .................. 360/59, 360/75, 69, 235.2, 235.3; 399/328, 329, 399/69; 369/59.24; 219/619, 388, 328
See application file for complete search history.

(56) References Cited

U.S. PATENT DOCUMENTS

| | | | | |
|---|---|---|---|---|
| 3,876,860 A * | 4/1975 | Nomura et al. | ............. | 219/388 |
| 5,537,381 A | 7/1996 | Fuji | ............. | 369/116 |
| 5,625,616 A | 4/1997 | Koike et al. | ............. | 369/116 |
| 6,038,101 A * | 3/2000 | Yoda et al. | ............. | 360/235.2 |
| 6,256,171 B1 * | 7/2001 | Yoda et al. | ............. | 360/235.3 |
| 6,603,619 B1 * | 8/2003 | Kojima et al. | ............. | 360/59 |
| 6,636,460 B2 | 10/2003 | Akiyama et al. | ............. | 369/13.14 |
| 6,741,524 B2 | 5/2004 | Ichihara et al. | ............. | 369/13.01 |
| 6,894,857 B2 | 5/2005 | Kikitsu et al. | ............. | 360/59 |
| 7,126,777 B2 | 10/2006 | Flechsig et al. | ............. | 360/59 |
| 7,133,254 B2 | 11/2006 | Hamann et al. | ............. | 360/126 |
| 7,239,471 B2 | 7/2007 | Tanabe | ............. | 360/75 |
| 7,473,871 B2 * | 1/2009 | Tajima et al. | ............. | 219/619 |
| 7,561,368 B2 * | 7/2009 | Kim et al. | ............. | 360/75 |
| 2005/0213436 A1 | 9/2005 | Ono et al. | ............. | 369/13.02 |

(Continued)

FOREIGN PATENT DOCUMENTS

CN 101015007 A 8/2007

(Continued)

OTHER PUBLICATIONS

Wipiejewski et al., "Integration of Active Optical Components" www.ece.ucsb.edu/Faculty/Coldren/papers/Wipie2.pdf.

(Continued)

*Primary Examiner*—Fred Tzeng
(74) *Attorney, Agent, or Firm*—Zilka-Kotab, PC (57) ABSTRACT

A method according to one embodiment comprises using a heating device, inducing localized heating on a magnetic medium during a recording operation; detecting a temperature in a vicinity of the heating device; detecting a current of the heating device; and performing an action if a function of at least one of the temperature and the current is outside an acceptable operation zone. A method according to another embodiment comprises selecting an initial current of a heating device for inducing localized heating on a magnetic medium during recording operations; initiating the heating device; performing recording operations; monitoring a temperature in a vicinity of the heating device during the recording operations; and if a function of the temperature and the current is outside an acceptable operation zone, changing an operating parameter such that the function of the temperature and the current is in the acceptable operation zone.

25 Claims, 7 Drawing Sheets

U.S. PATENT DOCUMENTS

| | | | |
|---|---|---|---|
| 2006/0117333 A1 | 6/2006 | Taguchi et al. | 720/659 |
| 2007/0014041 A1 | 1/2007 | Lille et al. | 360/6 |
| 2007/0036570 A1* | 2/2007 | Tatematsu et al. | 399/69 |
| 2007/0041757 A1* | 2/2007 | Tajima et al. | 399/328 |
| 2007/0291614 A1* | 12/2007 | Saga et al. | 369/59.24 |
| 2009/0052955 A1* | 2/2009 | Tatematsu et al. | 399/329 |

FOREIGN PATENT DOCUMENTS

| | | |
|---|---|---|
| JP | 63317948 | 12/1988 |
| JP | 02033748 | 2/1990 |
| JP | 2005092988 | 4/2005 |

OTHER PUBLICATIONS

Chinese Office Action Summary from application No. 200910003384.1 dated Aug. 3, 2010.

* cited by examiner

METHOD, SYSTEM, AND COMPUTER PROGRAM PRODUCT FOR THERMALLY ASSISTED RECORDING SYSTEMS

FIELD OF THE INVENTION

The present invention relates to data storage systems, and more particularly, this invention relates to data storage systems using thermally assisted recording.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Thermally assisted recording is an emerging field in data recording. Accordingly, challenges have arisen during development of this technology. The following description provides solutions to some of those challenges.

SUMMARY OF THE INVENTION

A method according to one embodiment comprises using a heating device, inducing localized heating on a magnetic medium during a recording operation; detecting a temperature in a vicinity of the heating device; detecting a current of the heating device; and performing an action if a function of at least one of the temperature and the current is outside an acceptable operation zone.

A method according to another embodiment comprises selecting an initial current of a heating device for inducing localized heating on a magnetic medium during recording operations; initiating the heating device; performing recording operations; monitoring a temperature in a vicinity of the heating device during the recording operations; and if a function of the temperature and the current is outside an acceptable operation zone, changing an operating parameter such that the function of the temperature and the current is in the acceptable operation zone.

A method according to yet another embodiment comprises monitoring a temperature in a vicinity of a heating device for inducing localized heating on a magnetic medium during recording operations; detecting a current of the heating device; and performing an action if a function of the temperature and the current moves outside an acceptable operation zone.

A system according to one embodiment comprises a magnetic medium; and
a head for reading and writing to the magnetic medium, wherein at least one of the magnetic medium and a secondary memory has computer code stored thereon, which when executed, causes the drive to perform the following operations:

induce localized healing on a magnetic medium during a recording operation using a heating device;
detect a temperature in a vicinity of the heating device;
detect a current of the heating device; and
perform an action if a function of at least one of the temperature and the current is outside an acceptable operation zone.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

The following description discloses several preferred embodiments of magnetic storage systems, as well as operation and/or component parts thereof and/or testing/reliability systems and methods for magnetic storage systems.

In one general embodiment, a method includes using a heating device, inducing localized heating on a magnetic medium during a recording operation; detecting a temperature in a vicinity of the heating device; detecting a current of the heating device; and performing an action if a function of at least one of the temperature and the current is outside an acceptable operation zone.

In another general embodiment, a method includes selecting an initial current of a heating device for inducing localized heating on a magnetic medium during recording operations; initiating the heating device; performing recording operations; monitoring a temperature in a vicinity of the heating device during the recording operations; and if a function of the temperature and the current is outside an acceptable operation zone, changing an operating parameter such that the function of the temperature and the current is in the acceptable operation zone.

In another general embodiment, a method includes monitoring a temperature in a vicinity of a heating device for inducing localized heating on a magnetic medium during recording operations; detecting a current of the beating device; and performing an action if a function of the temperature and the current moves outside an acceptable operation zone.

In another general embodiment, a system, e.g., a drive or array of drives, a computer, etc, implements methodology disclosed herein.

Figure 1:
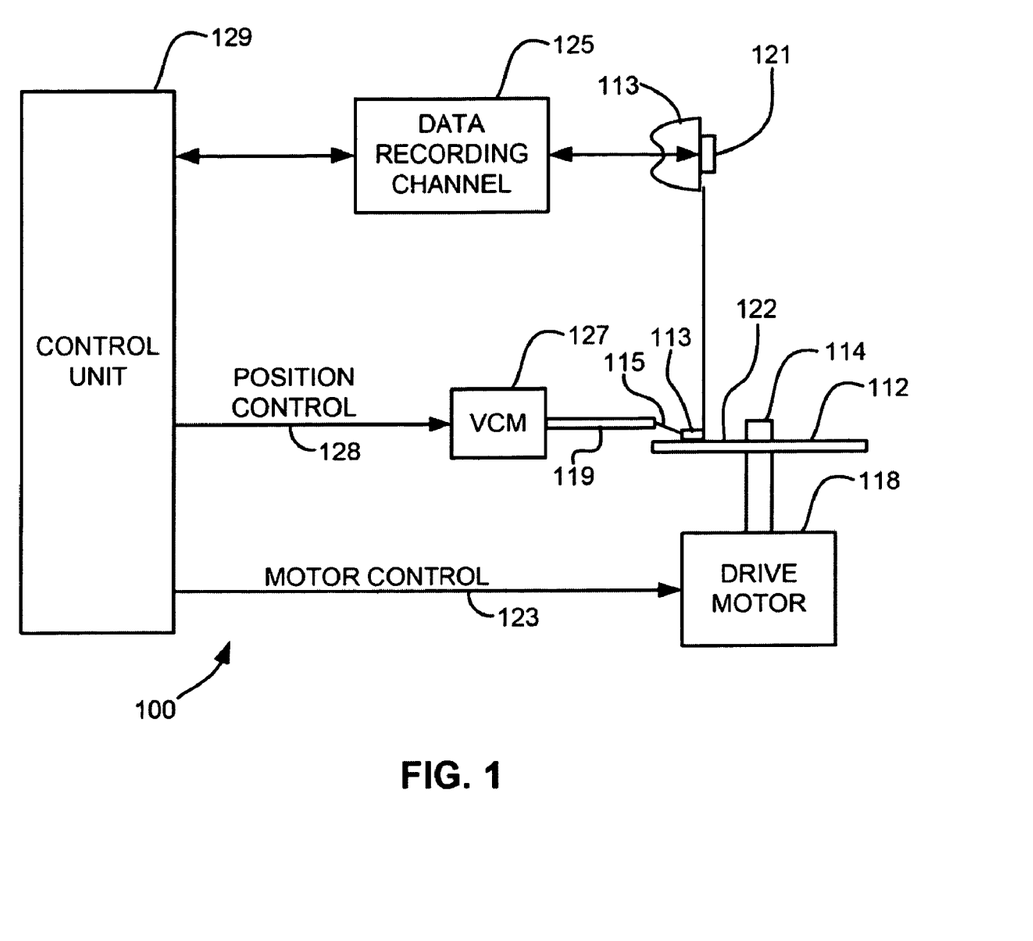
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Figure 2A:
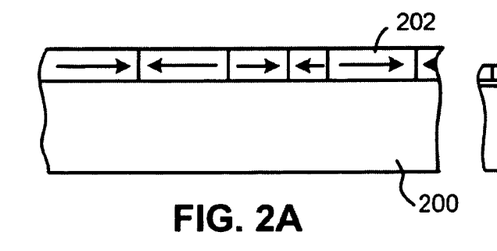
FIG. 2A is a schematic representation in section of a recording medium utilizing a longitudinal recording format.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figures 2B, 2D, 2E:
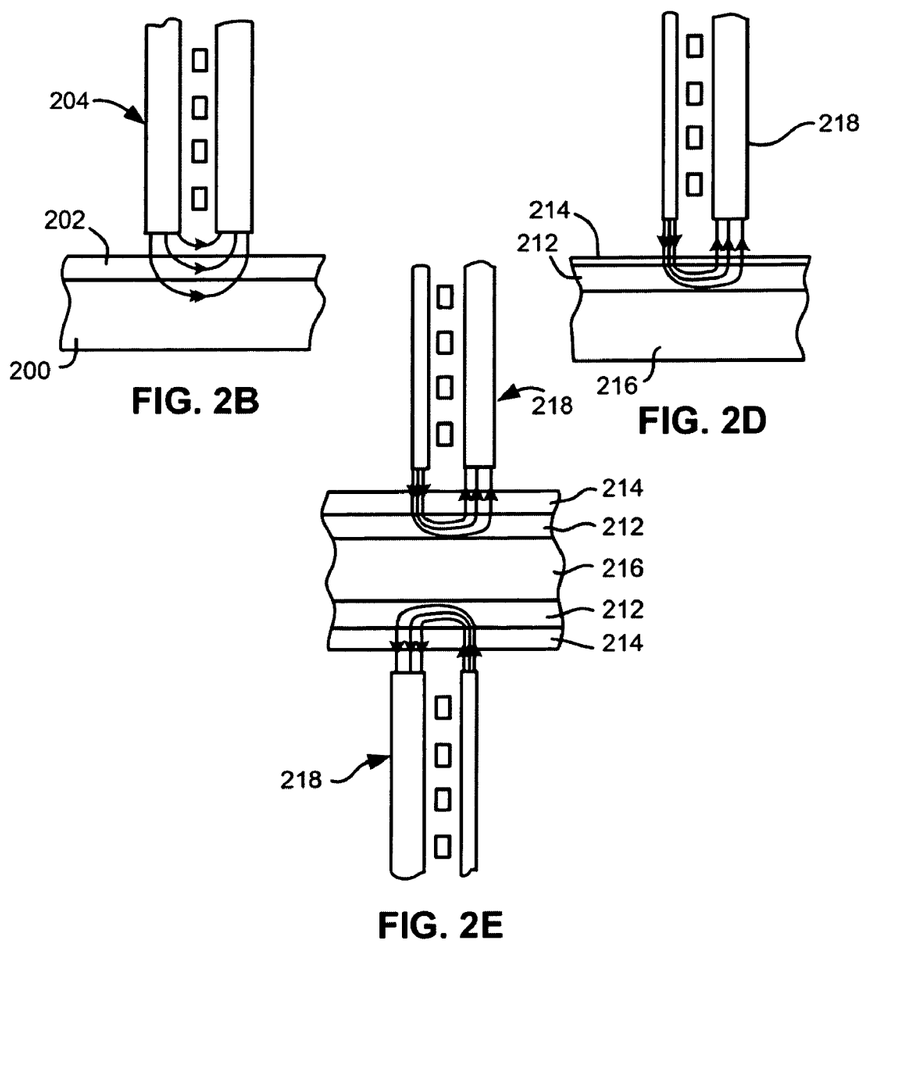
FIG. 2B is a schematic representation of a conventional magnetic recording head and recording medium combination for longitudinal recording as in FIG. 2A.
FIG. 2D is a schematic representation of a recording head and recording medium combination for perpendicular recording on one side.
FIG. 2E is a schematic representation of the recording apparatus of the present invention, similar to that of FIG. 2D, but adapted for recording separately on both sides of the medium.

FIG. 2B shows the operative relationship between a conventional recording/playback head 204, which may preferably be a thin film head, and a conventional recording medium, such as that of FIG. 2A.

Figure 2C:
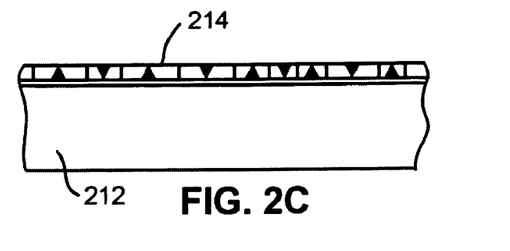
FIG. 2C is a magnetic recording medium utilizing a perpendicular recording format.

FIG. 2C illustrates schematically the orientation of magnetic impulses substantially perpendicular to the surface of the recording medium. For such perpendicular recording the medium includes an under layer 212 of a material having a high magnetic permeability. This under layer 212 is then provided with an overlying coating 214 of magnetic material preferably having a high coercivity relative to the under layer 212.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

Figure 3:
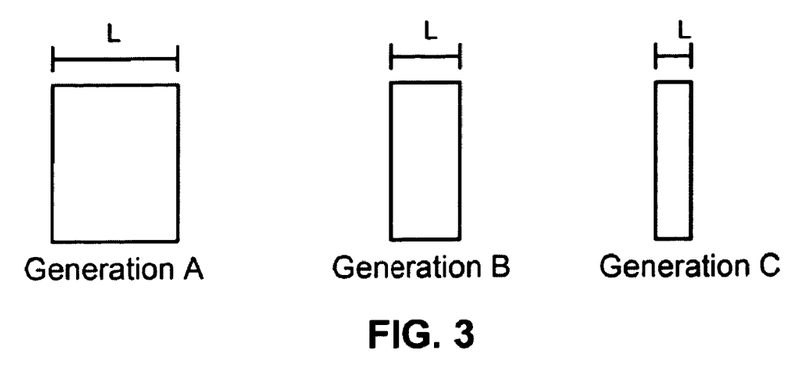
FIG. 3 is a graphical depiction of bit lengths.

A continuing goal of magnetic recording is to maximize the number of bits stored per unit area of a magnetic medium. One way to do this is to increase the number of bits per track on the medium, such as by reducing the bit length along the data track. Referring to FIG. 3, there is shown a progression of bit length (L) reduction on the magnetic medium, referred to generically as Generation A, Generation B, and Generation C. However, reducing the bit length can lead to a loss of data from the disk due to such things as thermal fluctuations. Particularly, as the bit size is reduced, the energy that is required to flip the bit's magnetic polarity is reduced as a function of volume over temperature, as noted in Equation 1:

$$E \sim AV/kT \qquad \text{Equation 1}$$

where E is the Energy or heat required to flip the bit's polarity, V is the volume of magnetic medium that the bit occupies, A is the anisotropy of the magnetic grains in the medium, k is the Boltzmann constant and T is the temperature. As the volume is reduced, the energy required to flip the bit is reduced and thermal fluctuations can lead to data loss. Since a reduction in volume of the bit is desired, but data loss is not acceptable, the anisotropy of the bit material must be higher at working temperatures to prevent the bit from flipping due to, e.g., thermal fluctuations, which could result in data loss. Therefore, selection of magnetic media with a higher anisotropy is desirable.

Figure 4:
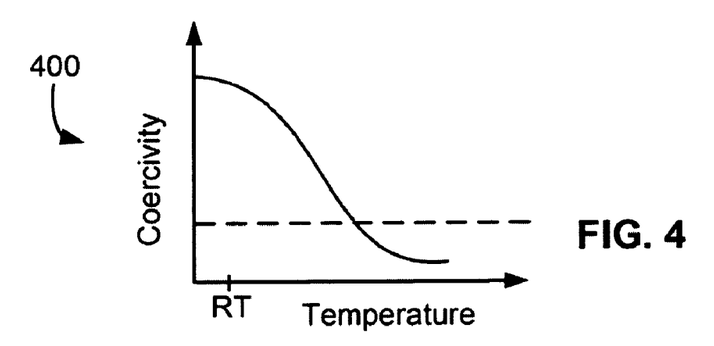
FIG. 4 is a graph of Coercivity versus Temperature of a material in a recording layer of a magnetic medium.

Writing to magnetic media having very high coercivity becomes difficult, as increased antisotropy or coercivity of a magnetic medium makes the disk more resistive to writing (changing the orientation of the bits). To overcome this increased resistivity to writing, the magnetic medium may be heated to reduce the amount of magnetic flux required to reorient the magnetic bits. FIG. 4 discloses a graph 400 (representative only) of Coercivity (measured in Oersted) versus Temperature (measured in Kelvin). As shown, at room temperature (RT), the coercivity of the magnetic medium is above a practically writeable coercivity level, shown as dashed line 405 under which writing to the disk is feasible, preferably with conventional writing techniques, and above which the magnetic medium is stable and thermal fluctuations will not readily cause the bits to flip. The magnetic medium may be heated to reduce the coercivity below the threshold 405, allowing writing to the magnetic medium. Therefore, by heating the magnetic medium, the magnetic medium will enter a state at which bits can be more easily oriented, thereby resulting in data being stored on the magnetic medium.

Figure 5:
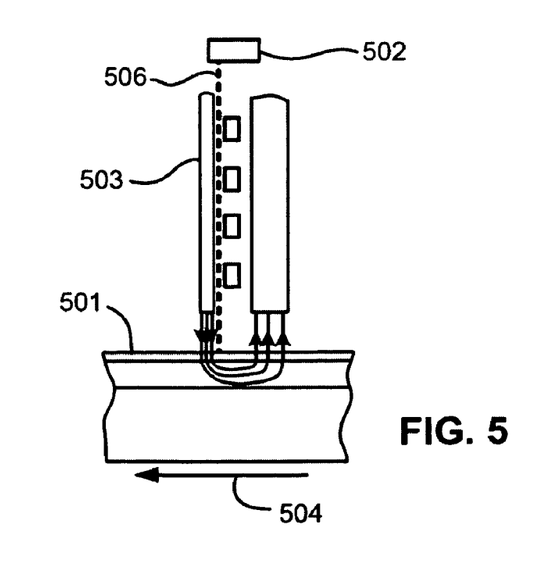
FIG. 5 is a system diagram of a system for localized heating of the magnetic medium for thermally assisted writing.

FIG. 5 illustrates a system for localized heating of the magnetic medium 501 for thermally assisted writing. The magnetic medium 501 moves in the direction of the arrow 504. A heating device 502 heats the magnetic medium just prior to the heated portion arriving at the writing pole 503 of the head, e.g., using a laser beam 506. This results in the magnetic medium having a reduced anisotropy due to the increased temperature of the medium adjacent the writing pole 503 of the head. After the heated portion of the magnetic medium 501 has moved past the writing pole 503 of the head, the temperature of the magnetic medium 501 decreases rapidly so that the anisotropy thereof returns to a higher, more stable level.

Illustrative heating devices may use a beam of light, a beam of electrons, radiation, etc. For instance, a laser may be used. In another approach, an electron emitter may employ an electron cone to focus electrons emitted therefrom onto the medium.

A problem that is encountered when using a heating device such as a laser to heat the magnetic medium is that many heating devices are susceptible to failure due to overheating or current overstress. Using a laser as an exemplary heating device, the laser must be capable of heating the magnetic medium to a temperature great enough to reduce the anisotropy of the magnetic material to a level at which recording can occur, but losses in the system will likely vary from laser/head to laser/head. Therefore, the laser may at times run hot and/or above a desired current level. This may in turn reduce the life of the heating device. Once the heating device fails, the magnetic medium may be unwritable. The following description discloses several methods for quality assurance, alerting, adjusting, etc. in relation to heating devices.

Figure 6:
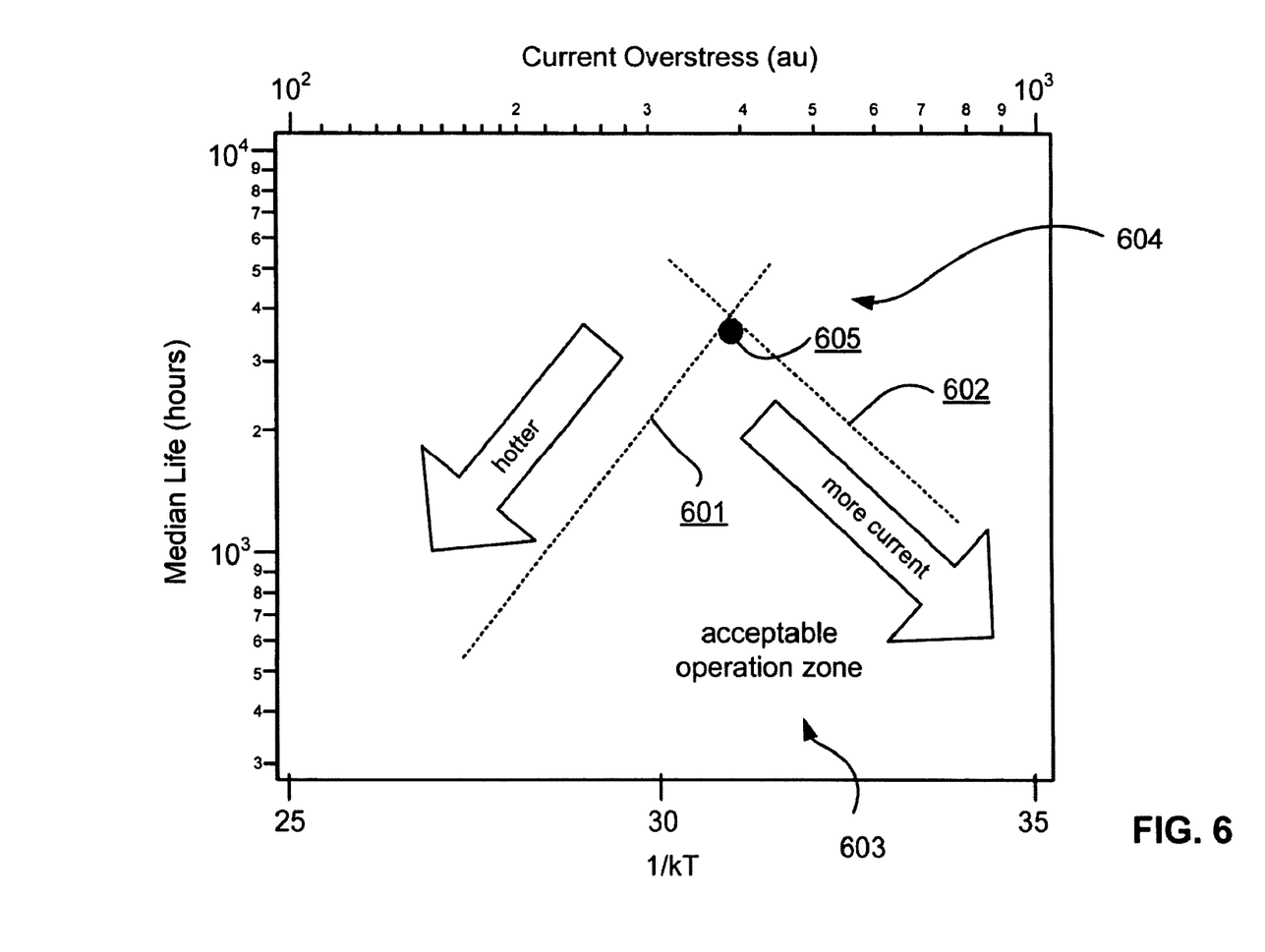
FIG. 6 is a graph of Median Laser Life versus the inverse of Temperature, with Current overstress overlaid on the top axis of the graph.

Continuing with a laser as an exemplary heating device, FIG. 6 discloses a graph 600 of Median Laser Life (in logarithmic hours) versus the inverse of Temperature, with Current overstress overlaid on the top axis of the graph (in logarithmic arbitrary unites of current). As a point moves from the left to the right of the graph, the temperature and current both increase. As a point moves up the graph, the lifetime of the laser increases. Line 601 is the failure line indicating that as the temperature of the laser increases, the laser will suffer thermal fatigue or failure resulting in shorter laser lifetimes for increasing temperatures. Line 602 is the failure line indicating that as the current input to the laser increases, the laser will suffer current overstress fatigue or failure resulting in shorter laser lifetimes as the current is increased. Area 603 appearing below Line 601 and Line 602 is the preferred operating range for the laser to ensure the laser does not fail due to overheating or current overstress, and point 605 is the ideal operating condition for maximum laser lifetime combined with avoidance of laser failure. Area 604 appearing above Line 601 and Line 602 indicates the ranges of operation which may result in premature laser failure.

Figure 7:
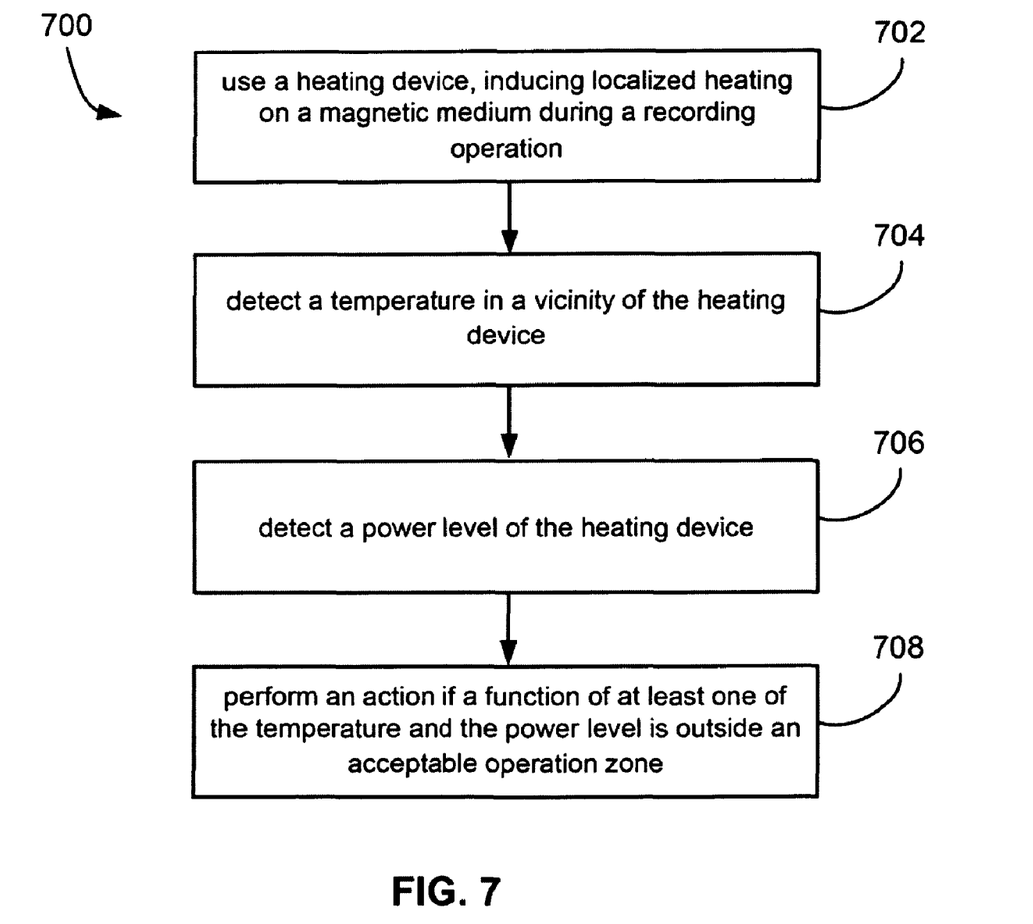
FIG. 7 is a flow diagram of a process according to one embodiment.

FIG. 7 illustrates a method 700 according to one embodiment. As an option, the present method 700 may be implemented in the context of the functionality and architecture of FIGS. 1-6. Of course, however, the method 700 may be carried out in any desired environment. It should also be noted that the aforementioned definitions may apply during the present description.

With continued reference to FIG. 7, in operation 702, a heating device is used to induce localized heating on a magnetic medium during a recording operation. The description above illustrates possible methods and devices for inducing such localized heating, though any type of heating device can be used.

In operation 704, a temperature in a vicinity of the heating device is detected, e.g., somewhere in the drive, which could be a temperature on or near the heating device, a temperature on or near a slider or head, an ambient temperature near a corner or side of the housing, etc. This temperature measurement can be accomplished with a thermocouple placed near the heating device. The temperature can also be determined by analyzing a readback signal, the strength of which is a function of temperature. Although this measures the ambient temperature of the heating device, it works as a sufficient approximation of the laser operating temperature.

In operation 706, a current of the heating device is detected, e.g., by monitoring the feed or ground line of the circuit controlling the heating device, a level of the heating device's power supply, etc. To measure the current of the laser, a resistor can be connected in series with the current path of the laser, and a voltage corresponding the current can be applied to a control device.

In operation 708, an action is performed if a function of the temperature and/or the current is outside an acceptable operation zone, where the zone may be prespecified. In one approach, the function of the temperature and the current includes a product or sum of the temperature and the current. Illustrative equations for calculating such product or summation are shown below:

$$P<\log(T+A+j) \qquad \text{Equation 2}$$

$$P<\text{long}(T+A+t+h) \qquad \text{Equation 3}$$

$$P<\log(T+m) \qquad \text{Equation 4}$$

$$P<\log(A+n) \qquad \text{Equation 5}$$

where T is the temperature, A is the current, t is time (e.g., time heating device is in operation, time drive is in use, some repeating time period, etc.), and j, h, m and n are some constant or variable. Accordingly, when function P is above a predetermined threshold, i.e., outside an acceptable operation zone, some action is performed. Derivatives and/or combinations of these equations may also be employed.

As noted above, one or more actions can be performed. In one approach, the output of the laser can be adjusted to stay within the preferred operating range by a control device.

In another approach, performing the action includes outputting an alert. Such alert may initiate or include an output to a user indicating possible trouble with the storage system and or part thereof (e.g., head). Such alert may also or alternatively recommend or instruct the user to back up data stored on the storage device. Other types of alerts may also be presented to a user, an administrator, etc. Further, such alerts may take the form of graphical alerts, audible alerts, electronic messages, etc.

In yet another approach, the action includes disabling the heating device. Such disablement may be temporary or permanent. In the former case, the heating device may be enabled once the temperature is low enough that the function of the temperature and the current is back in the acceptable operation zone. In the latter case, while this may disable the writer for the particular head, the data already written can be read back as long as the sensor on the head is operational. Accordingly, in one embodiment having multiple heads, the drive simply continues to operate with diminished rewritable capacity. In other approaches, the data present on the side of the disk facing the heating device is copied to the other side of the disk and/or to another disk.

In a further approach, performing the action includes reducing the current of the heating device. Preferably, the current is reduced enough to return the function to the acceptable zone. Such an approach is particularly useful during manufacture, quality assurance testing, and/or in the drive during use. Again, losses in the system vary from device to device, and therefore, such an approach allows adjustment of the system to provide an acceptable writing configuration while maximizing the life of the heating device. Accordingly, in one general embodiment, an iterative approach may be taken to set the current to the heating device. For example, the temperature and/or power may be monitored during a recording operation and the readback signal measured. The current may be part of an interactive process where the read back signal is maximized to a point where the expected lifetime of the heating device (or head itself) is within an acceptable range.

In one embodiment in which the current of the heating device is reduced, the heating device is used at the reduced current to induce localized heating on a magnetic medium during a recording operation for writing data to the magnetic medium. An attempt to read the data from the magnetic medium is made, and if the data is successfully read from the magnetic medium, further recording operations may be performed at the reduced current. If the data is not successfully read from the magnetic medium, a further action, e.g., as set forth above, may be performed. For example, this further action may include one or more of outputting an alert, further reducing the current of the heating device, disabling the heating device, etc.

Figure 8:
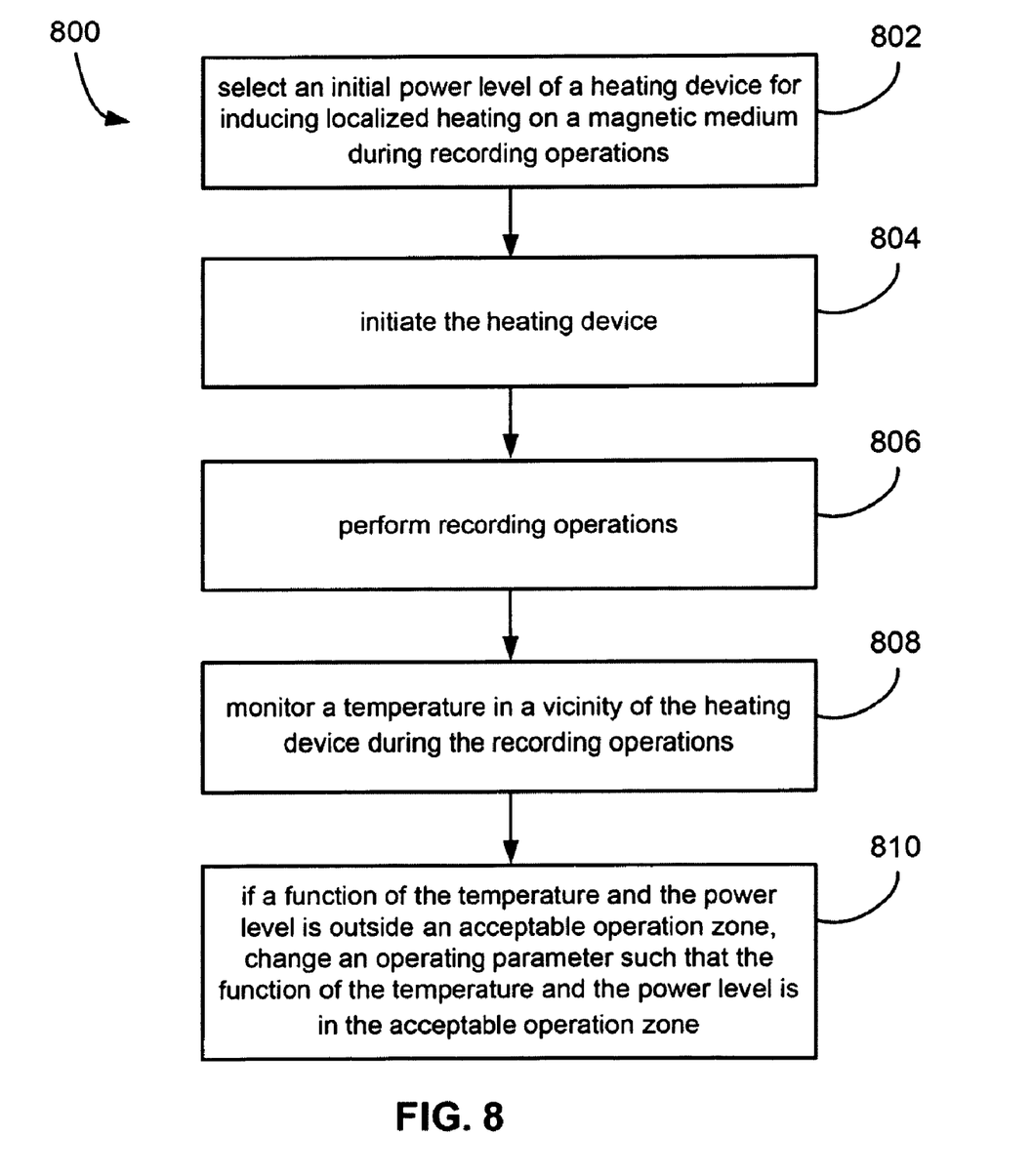
FIG. 8 is a flow diagram of a process according to one embodiment.

FIG. 8 illustrates a method 800 according to another embodiment. In operation 802, an initial current of a heating device is selected for inducing localized heating on a magnetic medium during a recording operation. In operation 804, the heating device is initiated. In operation 806, recording operations are performed. In operation 808, a temperature is monitored in a vicinity of the heating device during the recording operations, and if a function of the temperature and the current is outside an acceptable operation zone, an operating parameter is changed in operation 810 such that the function of the temperature and the current is in the acceptable operation zone.

In one approach, changing the operation parameter includes reducing the current of the heating device. In an illustrative embodiment, the heating device is used at the reduced current to induce localized heating on a magnetic medium during a recording operation for writing data to the magnetic medium. Then the temperature is again monitored in the vicinity of the heating device, and an attempt to read the data from the magnetic medium is made. If the data is successfully read from the magnetic medium, a further recording operations is performed at the reduced current. If the data is not successfully read from the magnetic medium, a further action is performed, e.g., as described above.

In another approach, changing the operation parameter includes reducing a current of a heater that is used to induce thermal protrusion. This may reduce the temperature in the vicinity of the heating device.

Again, the heating device can be a laser or other type of heating device. Also, the function may again be a product of the temperature and/or the current.

Figure 9:
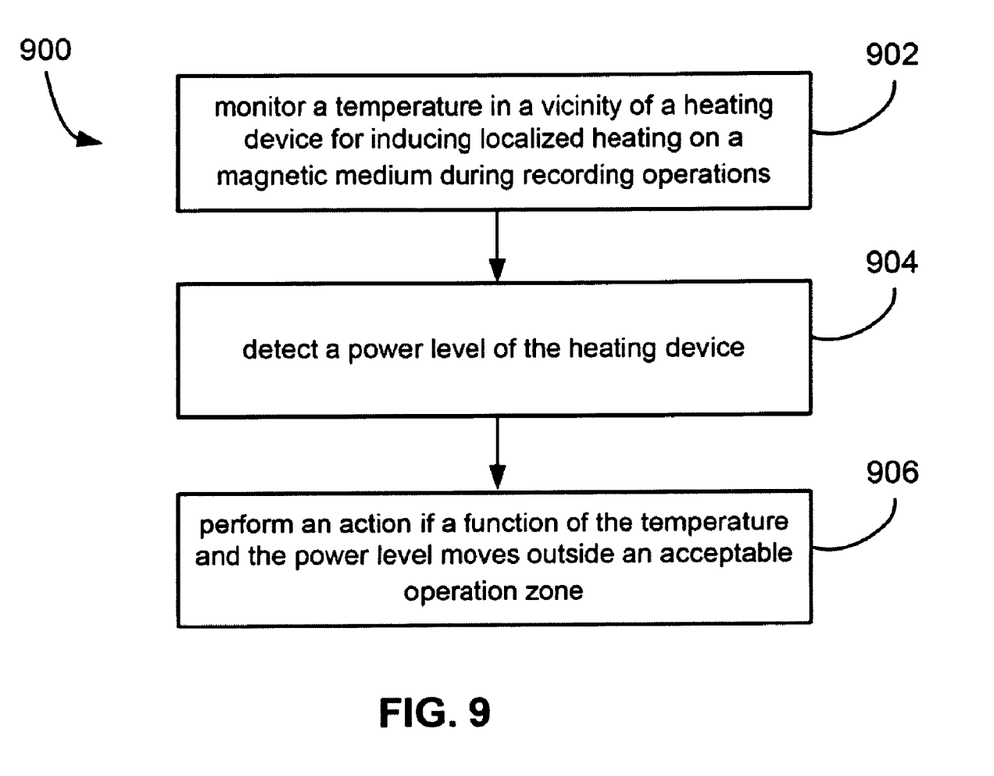
FIG. 9 is a flow diagram of a process according to one embodiment.

FIG. 9 illustrates a method 900 according to yet another embodiment. In operation 902, a temperature is monitored in a vicinity of a heating device for inducing localized heating on a magnetic medium during recording operations, then detecting a current of the heating device in operation 904, and performing an action if a function of the temperature and the current moves outside an acceptable operation zone in operation 906.

Again, performing the action may include outputting an alert, temporarily disabling the heating device, minimizing use of the heating device (such as by preferentially writing using other heads during normal operation,) etc.

It should be noted that methodology presented herein for at least some of the various embodiments may be implemented, in whole or in part, in hardware (e.g., logic), software, by hand, using specialty equipment, etc. and combinations thereof.

Embodiments of the present invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), RAM, etc. Further, such software can be downloadable or otherwise transferable from one computing device to another via network, wireless link, nonvolatile memory device, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
using a heating device, inducing localized heating on a magnetic medium during a recording operation;
detecting at least one of a temperature in a vicinity of the heating device and a current of the heating device;
performing an action if a function of the at least one of the temperature and the current is outside an acceptable operation zone, wherein performing the action includes reducing the current of the heating device;
using the heating device at the reduced current, inducing localized heating on a magnetic medium during a recording operation for writing data to the magnetic medium;
attempting to read the data from the magnetic medium; and
if the data is successfully read from the magnetic medium, performing further recording operations at the reduced current.

2. A method as recited in claim 1, wherein the heating device is a laser.

3. A method as recited in claim 1, wherein the temperature is detected using a thermocouple in a housing encasing the magnetic medium.

4. A method as recited in claim 1, wherein the temperature is detected using a sensor for reading data from the magnetic medium.

5. A method as recited in claim 1, wherein the function includes a product of the temperature and the current.

6. A method as recited in claim 1, wherein performing the action includes outputting an alert.

7. A method as recited in claim 1, wherein performing the action includes disabling the heating device.

8. A method as recited in claim 7, wherein the heating device is re-enabled upon the function of the temperature and the current returning to within the acceptable operation zone.

9. A method as recited in claim 1, wherein if the data is not successfully read from the magnetic medium, performing a further action.

10. A method as recited in claim 9, wherein performing the further action includes at least one of outputting an alert, further reducing the current of the heating device, and disabling the heating device.

11. A method, comprising:
using a heating device, inducing localized heating on a magnetic medium during a recording operation;
detecting a temperature in a vicinity of the heating device;
detecting a current of the heating device; and
performing an action if a function of at least one of the temperature and the current is outside an acceptable operation zone, wherein performing the action includes reducing the current of the heating device;
using the heating device at the reduced current, inducing localized heating on a magnetic medium during a recording operation for writing data to the magnetic medium;
attempting to read the data from the magnetic medium;
if the data is successfully read from the magnetic medium, performing further recording operations at the reduced current; and
if the data is not successfully read from the magnetic medium, performing a further action.

12. A method, comprising:
selecting an initial current of a heating device for inducing localized heating on a magnetic medium during recording operations;
initiating the heating device;
performing recording operations;
monitoring a temperature in a vicinity of the heating device during the recording operations;
if a function of the temperature and the current is outside an acceptable operation zone, changing an operating parameter such that the function of the temperature and the current is in the acceptable operation zone wherein changing the operation parameter includes reducing the current of the heating device;
using the heating device at the reduced current, inducing localized heating on a magnetic medium during a recording operation for writing data to the magnetic medium;
again monitoring the temperature in the vicinity of the heating device;
attempting to read the data from the magnetic medium; and
if the data is successfully read from the magnetic medium, performing further recording operations at the reduced current.

13. A method as recited in claim 12, further comprising:
if the data is not successfully read from the magnetic medium, performing a further action.

14. A method as recited in claim 13, wherein the further action includes outputting an alert.

15. A method as recited in claim 12, wherein changing the operation parameter includes reducing a current of a heater, the heater being for selectively inducing thermal protrusion.

16. A method as recited in claim 12, wherein the heating device is a laser.

17. A method as recited in claim 12, wherein the function includes a product of the temperature and the current.

18. A method, comprising:
monitoring a temperature in a vicinity of a heating device for inducing localized heating on a magnetic medium during recording operations;
detecting a current of the heating device; and
performing an action if a function of at least one of the temperature and the current moves outside an acceptable operation zone, wherein performing the action includes outputting an alert.

19. A method as recited in claim 18, wherein performing the action further includes:

using the heating device at the reduced current, inducing localized heating on a magnetic medium during a recording operation for writing data to the magnetic medium;

again monitoring the temperature in the vicinity of the heating device;

attempting to read the data from the magnetic medium;

if the data is successfully read from the magnetic medium, performing further recording operations at the reduced current.

20. A method as recited in claim 18, wherein performing the action further includes at least temporarily disabling the heating device.

21. A method as recited in claim 18, wherein performing the action further includes minimizing use of the heating device.

22. A system comprising:

a magnetic medium; and a head for reading and writing to the magnetic medium, wherein at least one of the magnetic medium and a secondary memory has computer code stored thereon, which when executed, causes the drive to perform the following operations:

induce localized heating on a magnetic medium during a recording operation using a heating device;

detect at least one of a temperature in a vicinity of the heating device; detect and a current of the heating device;

reducing the current of the heating device if a function of the at least one of the temperature and the current is outside an acceptable operation zone;

using the heating device at the reduced current, inducing localized heating on a magnetic medium during a recording operation for writing data to the magnetic medium;

attempting to read the data from the magnetic medium; and if the data is successfully read from the magnetic medium, performing further recording operations at the reduced current.

23. A system as recited in claim 22, wherein if the data is not successfully read from the magnetic medium, performing a further action.

24. A system as recited in claim 22, wherein the temperature is detected using a thermocouple in a housing encasing the magnetic medium.

25. A system as recited in claim 22, wherein the temperature is detected using a sensor for reading data from the magnetic medium.

* * * * *